United States Patent Office 3,812,148
Patented May 21, 1974

3,812,148
PREPARATION OF 2-PYRROLIDONE
Elmer J. Hollstein, Wilmington, Del., and Walter A. Butte, Jr., West Chester, Pa., assignors to Sun Research and Development Co., Philadelphia, Pa.
No Drawing. Filed July 21, 1972, Ser. No. 274,039
Int. Cl. C07d 27/08
U.S. Cl. 260—326.5 FN 7 Claims

ABSTRACT OF THE DISCLOSURE

A process for preparing 2-pyrrolidone which comprises reacting succinic acid or its precursor, hydrogen, and ammonia in an aqueous system at a mole ratio of ammonia to acid of 1.3:1 to 1.7:1, at a temperature of from about 250° C. to about 275° C., at a pressure of from about 1500 to 2000 p.s.i.g., for a time of about 1 to 4 hours, and in the presence of a catalyst of ruthenium.

---

The conversion of anhydrides such as maleic anhydride and succinic anhydride to 2-pyrrolidone is known in the art. For example, U.S. 3,080,377 (Liao, assigned to FMC Corp., issued Mar. 5, 1963) discloses that succinic anhydride may be converted to 2-pyrrolidone by reaction for 1 to 8 hours with ammonia (1 to 20 moles per mole of anhydride, preferably 2 to 5 moles of liquid ammonia) and at least one mole of hydrogen at 200°–300° C., at 500 to 5000 p.s.i.g., and in the presence of catalysts such as cobalt, nickel, ruthenium, and palladium. Yields of 2-pyrrolidone product are on the order of 50% (with ruthenium on carbon as catalyst) to 70% of theory (with Raney cobalt).

U.S. 3,198,808 (Himmele et al., assigned to BASF, issued Aug. 3, 1965) discloses preparation of 2-pyrrolidone from maleic acid and ammonia using a specially prepared sintered oxide catalyst whereby high yields are obtained.

U.S. 3,109,005 (Lidov, assigned to Halcon International, Inc., issued Oct. 29, 1963) discloses preparation of 2-pyrrolidone and its N-substituted derivatives from maleic anhydride in a solvent system by reaction of hydrogen and 5 moles of ammonia or suitable amine per mole of anhydride at 150° to 350° C., for 10 to 12 hours at 100 to 300 atmospheres and in the presence of a hydrogenation catalyst such as Raney nickel, Raney cobalt, or palladium or platinum on a support. Yields of product are given as about 65% to 76% of theory.

In investigating the process of making 2-pyrrolidone in an aqueous system it has been found that yields are generally poor being less than about 60% of theory. Furthermore, although many catalysts and catalyst supports are suggested for the process, the reaction appears to be highly sensitive to catalyst metal and certain reaction parameters. It has now been discovered that in the conversion of succinic acid or its precursor (e.g., anhydride) to 2-pyrrolidones in an aqueous system, surprisingly high yields of about 90 mole percent and over can be obtained by following the process of this invention.

In accord with the invention, 2-pyrrolidone is prepared in high yield by reacting succinic acid (or its precursor) with ammonia in an aqueous system at a mole ratio of ammonia to acid of from 1.3:1 to 1.7:1, at a temperature of from about 250° C. to about 275° C., at a pressure of from about 1500 to about 2000 p.s.i.g., for a time of about 1 to about 4 hours, and in the presence of a catalyst of ruthenium supported on carbon.

The amount of ammonia used in the reaction is critical to achieve the high yields capable of the process. Maximum yield occurs when 1.3 to 1.7, preferably 1.6 moles of ammonia are used per mole of acid. Rapid yield fall-off occurs when deviating from this ratio. The temperature of reaction is from about 250° C. to about 275° C., preferably about 250°–260° C. At temperatures below about 250° C. the reaction is so slow as to be impractical, and at temperatures much above about 275° C. the reaction proceeds to give pyrrolidines and not the desired pyrrolidone. While the times of reaction is a non-critical factor, it has been found that suitable reaction times will be from about 1 to about 4 hours, preferably 1 to 3 hours. The most preferred conditions for maximum yield, based on a statistical analysis of experimental data and confirmed by actual experiment indicate most preferred conditions of reaction to be a temperature of 252° C., an ammonia to acid mole ratio of 1.66, a hydrogen pressure of 1700 p.s.i.g. and reaction time of 2 hours.

As pointed auot above, a precursor of succinic acid may be used in the process. Thus for example, maleic acid, fumaric acid, maleic anhydride and the like may be employed which during the initial hydrogenation is converted *in situ* to succinic acid. It is important that such conversion occurs, because decomposition of the precursor may occur if the temperature is raised to reaction temperature so quickly that significant hydrogenation to succinic acid does not occur. Such decomposition will result in lower yields and also have an adverse effect on catalyst life. Succinic anhydride is also a useful precursor which will be hydrolyzed in the aqueous system to succinic acid.

As indicated, the process of the invention is also clearly dependent upon the use of a ruthenium catalyst, preferably supported on a conventional support which will contain from about 1% to 10% (preferably 5%) by weight ruthenium in the total catalyst-support composition. The amount of catalyst composition used in the process may vary from about 1% to about 10% by weight of the maleic anhydride, and will preferably be used at 5% by weight. The process of converting succinic anhydride or its precursor to 2-pyrrolidone proceeds efficiently with numerous catalyst supports such as carbon, alumina, kieselguhr, powdered pumice, fuller's earth, silica, silica-alumina, and the like. The supported ruthenium catalyst is also particularly advantageous in that it is rather insensitive to catalyst poisons particularly sulfur. Thus, the process can be carried out with relatively little preconditioning of equipment.

In order to illustrate the invention, the following examples are given.

EXAMPLE 1

A rocking one-liter stirred autoclave is charged with 98 g. of maleic anhydride, 5 g. of catalyst consisting of 5% by weight ruthenium on carbon, 343 ml. of water, and varying amounts of 28% aqueous ammonium hydroxide. The autoclave is closed and charged with hydrogen to 1600 p.s.i.g. pressure and is heated to 100° C. for 15 minutes to saturate the double bond. The reaction mass is then heated to 275° C. at which point a pressure of 1700 p.s.i.g. is maintained. After holding at a temperature of 275° C. for two hours the reaction mass is cooled, the contents removed and are analyzed by nuclear magnetic resonance. The data obtained is shown in the following table.

| Moles of ammonia per mole of anhydride: | Yield (mole percent) of 2-pyrrolidone |
|---|---|
| 1.0 | 50 |
| 1.25 | 75 |
| 1.55 | 88 |
| 2.1 | 72 |

EXAMPLE 2

As in Example 1, 49 g. of maleic anhydride is reacted with aqueous ammonium hydroxide to provide 1.66 moles of ammonia per mole of maleic anhydride. The reactor is pressured with hydrogen to 1600 p.s.i.g. and then heated first to 100° C. for 15 minutes and then to 252° C. and hydrogen pressure maintained at 1700 p.s.i.g. After a reaction time of 3 hours, the autoclave is cooled and analysis shows the reaction product to be 2-pyrrolidone in a yield of 92.5 mole percent.

EXAMPLE 3

Instead of using maleic anhydride in Example 2, succinic acid is used and the reaction mass heated directly to 252° C. and maintained at 1700 p.s.i.g. for 3 hours. A yield of 2-pyrrolidone of over 90 mole percent is obtained.

EXAMPLE 4

Following the details of Example 1, but using 10 grams of a catalyst of 5% ruthenium supported on alumina, 252 g. of maleic anhydride and 350 g. of water is reacted with ammonia at 252° C., a hydrogen pressure of 1700 p.s.i.g., and a reaction time of 3 hours. The following table indicates the results obtained at various mole ratios of ammonia to maleic anhydrides.

| Moles $NH_3$ per mole maleic anhydride: | Yield (mole percent) of 2-pyrrolidone |
|---|---|
| 1.3 | 88 |
| 1.5 | 92 |
| 1.7 | [1] 75 |
| 1.9 | 45 |

[1] Yield increased to over 90% after an additional 60 minutes reaction time.

The invention claimed is:

1. A process for preparing 2-pyrrolidone which comprises reacting succinic acid or its precursor consisting of maleic acid, fumaric acid, maleic anhydride or succinic anhydride, with hydrogen and ammonia in an aqueous system at a mole ratio of ammonia to acid from 1.3:1 to 1.7:1, at a temperature of from about 250° C. to about 275° C., at a pressure of from about 1500 to about 2000 p.s.i.g., for time of about 1 to about 4 hours, and in the presence of a supported ruthenium catalyst.

2. The process of claim 1 where the mole ratio is about 1.66, temperature is about 250° C., pressure is about 1700 p.s.i.g., reaction time is about 3 hours and the catalyst is supported on carbon.

3. The process of claim 1 where the mole ratio is about 1.66, the temperature is about 250° C., pressure is about 1700 p.s.i.g., reaction time is from about 3 to about 4 hours, and the catalyst is supported on alumina.

4. The process of claim 1 where a succinic acid precursor is used.

5. The process of claim 1 where succinic acid is reacted with ammonia.

6. A process for preparing 2-pyrrolidone which comprises reacting maleic anhydride, hydrogen, and ammonia in an aqueous system at a mole ratio of ammonia to maleic anhydride of about 1.66, at a temperature of about 250° C., a hydrogen pressure of about 1700 p.s.i.g., a reaction time of from about 1 to about 3 hours, and a catalyst of ruthenium supported on carbon where about 5% by weight of the catalyst-support composition is ruthenium.

7. A process for preparing 2-pyrrolidone which comprises reacting maleic anhydride, hydrogen, and ammonia in an aqueous system at a mole ratio of ammonia to maleic anhydride of about 1.66, at a temperature of about 250° C., a hydrogen pressure of about 1700 p.s.i.g., a reaction time of about 1 to about 4 hours, and a catalyst of ruthenium supported on alumina where about 5% by weight of the catalyst-support composition is ruthenium.

References Cited

UNITED STATES PATENTS

| 3,080,377 | 3/1963 | Liao | 260—326.5 FN |
| 3,448,118 | 6/1969 | Chichery et al. | 260—326.5 FN |

JOSEPH A. NARCAVAGE, Primary Examiner